US009408190B2

(12) United States Patent
Pan (10) Patent No.: US 9,408,190 B2
(45) Date of Patent: Aug. 2, 2016

(54) INFORMATION SENDING AND BLIND DETECTION METHOD AND DEVICE

(75) Inventor: Xueming Pan, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 96 days.

(21) Appl. No.: 14/356,589

(22) PCT Filed: Jul. 11, 2012

(86) PCT No.: PCT/CN2012/078486
§ 371 (c)(1),
(2), (4) Date: May 6, 2014

(87) PCT Pub. No.: WO2013/067828
PCT Pub. Date: May 16, 2013

(65) Prior Publication Data
US 2014/0301341 A1    Oct. 9, 2014

(30) Foreign Application Priority Data

Nov. 7, 2011   (CN) .......................... 2011 1 0349141

(51) Int. Cl.
*H04W 4/00*    (2009.01)
*H04W 72/04*   (2009.01)
*H04L 1/00*    (2006.01)

(52) U.S. Cl.
CPC ............. *H04W 72/04* (2013.01); *H04L 1/0026* (2013.01); *H04L 1/0091* (2013.01)

(58) Field of Classification Search
USPC .......... 370/241–254, 312–329; 455/450–561, 455/443
See application file for complete search history.

(56) References Cited

U.S. PATENT DOCUMENTS 8,717,989 B2 * 5/2014 Horiuchi ............... H04L 1/1861
370/328
8,755,345 B2 * 6/2014 Xie ....................... H04L 5/0053
370/328

(Continued)

FOREIGN PATENT DOCUMENTS

CN    102170703 A    8/2011
CN    102215586 A    10/2011

(Continued)

OTHER PUBLICATIONS

PCT International Search Report for PCT Counterpart Application No. PCT/CN2012/078486 with full English translation, 6 pgs. (Oct. 18, 2012).

(Continued)

*Primary Examiner* — Man Phan
(74) *Attorney, Agent, or Firm* — Blakely, Sokoloff, Taylor & Zafman LLP (57) ABSTRACT

Disclosed are an information sending and blind detection method and device, relating to the technical field of wireless communication technologies and for realizing a new information sending and blind detection method over a physical downlink control channel (PDCCH). In the present application, a base station determines a plurality of preset blind detection candidate sets, each blind detection candidate set containing at least one PDCCH candidate resource; and uses the PDCCH Candidates in at least one blind detection candidate set of the plurality of blind detection candidate sets to send control information to a terminal. The terminal determines a plurality of preset blind detection candidate sets, and performs blind detection of control information over the PDCCH Candidates in each blind detection candidate set of the plurality of blind detection candidate sets. By applying the present applications, a new information sending and blind detection method over a PDCCH is realized.

16 Claims, 4 Drawing Sheets

(56) References Cited

U.S. PATENT DOCUMENTS

| | | | |
|---|---|---|---|
| 8,767,585 B2* | 7/2014 | Pelletier | H04W 74/0833 370/203 |
| 8,934,916 B2* | 1/2015 | Pan | H04L 5/001 455/443 |
| 9,036,566 B2* | 5/2015 | Mochizuki | H04L 1/1685 370/329 |
| 9,100,952 B2* | 8/2015 | Miki | H04W 72/042 |
| 9,131,490 B2* | 9/2015 | Feng | H04L 5/0007 |
| 2010/0279628 A1* | 11/2010 | Love | H04L 5/0091 455/70 |
| 2010/0316146 A1* | 12/2010 | McBeath | H04L 5/0091 375/260 |
| 2011/0069637 A1* | 3/2011 | Liu | H04L 5/0007 370/254 |
| 2013/0250906 A1* | 9/2013 | Golitschek Edler von Elbwart | H04W 72/042 370/330 |
| 2014/0161082 A1* | 6/2014 | Gao | H04W 72/1263 370/329 |

FOREIGN PATENT DOCUMENTS

| | | |
|---|---|---|
| CN | 102404076 A | 4/2012 |
| WO | WO 2011/087272 | 7/2011 |
| WO | WO 2013/003218 A2 | 1/2013 |

OTHER PUBLICATIONS

EPO Communication enclosing Extended European Search Report for corresponding European Patent Application No. 12848274.2, 7 pages, (Aug. 22, 2014).

Research in Motion, et al., "Design Consideration for E-PDCCH", 3GPP TSG RAN WG1 Meeting #66bis, R1-113236, Zhuhai, China, 3 pages, (Oct. 10-14, 2011).

Alcatel-Lucent Shanghai Bell, et al., "PDCCH Capacity Analysis and Design Principles for Enhanced PDCCH", 3GPP TSG RAN WG1 Meeting #66bis, R1-113321, Zhuhai, China, 6 pages, (Oct. 10-14, 2011).

* cited by examiner

Prior Art

INFORMATION SENDING AND BLIND DETECTION METHOD AND DEVICE

CROSS-REFERENCE TO RELATED APPLICATIONS

The present application is a U.S. National Stage of International Application No. PCT/CN2012/078486, filed Jul. 11, 2012, designating the United States, and claiming priority to the Chinese Patent Application No. 201110349141.0 filed with the Chinese Patent Office on Nov. 7, 2011, entitled "INFORMATION TRANSMISSION SENDING AND BLIND DETECTION METHOD AND DEVICE", which was incorporated by reference in its entirety.

FIELD OF THE INVENTION

The present invention relates to the field of wireless communications and particularly to a method for transmitting information and blind detection of information and apparatus.

BACKGROUND OF THE INVENTION

Figure 1:
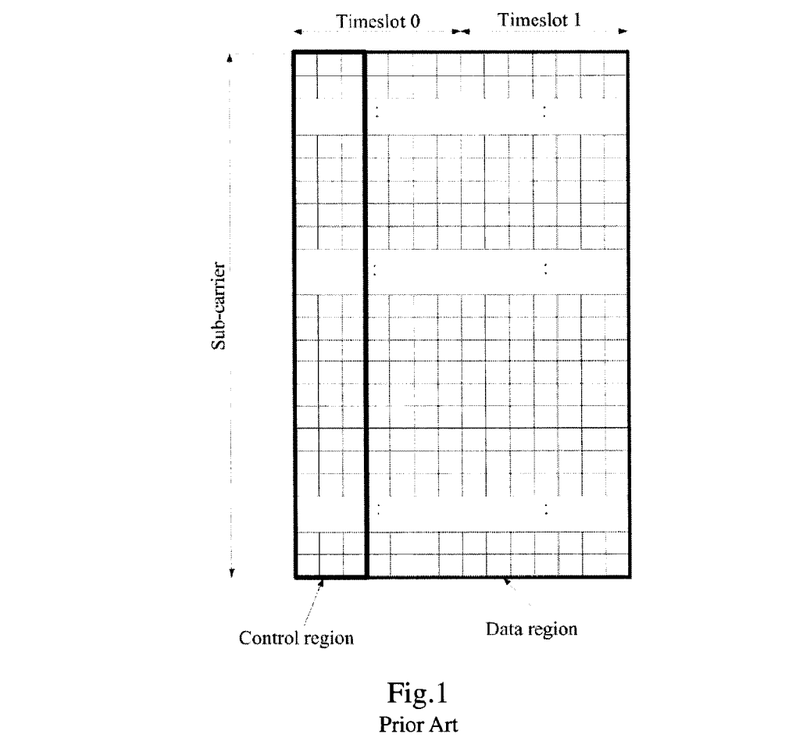
FIG. 1 is a schematic diagram of a control region and a data region multiplexed in a downlink sub-frame in the prior art.

In a Long Term Evolution (LTE) system, Physical Downlink Control Channels (PDCCHs) are transmitted in a downlink sub-frame, and the PDCCHs have a Time Division Multiplexing (TDM) relationship with Physical Downlink Shared Channels (PDSCHs). The PDCCHs are transmitted in first N Orthogonal Frequency Division Multiplexing (OFDM) symbols of a downlink sub-frame, where N may take the values 1, 2, 3 and 4, and N=4 may be allowable to occur only in a system at a system bandwidth of 1.4 MHz, as illustrated in FIG. 1.

A control region for transmission of the PDCCHs in the LTE system is constructed from Control Channel Elements (CCEs) divided logically, where the CCEs are mapped to Resource Elements (REs) through full interleaving thereof. Downlink Control Information (DCI) is transmitted also in CCEs, and one DCI for a User Equipment (UE) can be transmitted in N consecutive CCEs, where N in the LTE system may take the values 1, 2, 4 and 8, referred to an CCE aggregation level. The UE performs PDCCH blind detection in the control region to search for a PDCCH transmitted thereto, that is, the UE attempts decoding on different DCI formats and CCE aggregation levels using a Radio Network Temporary Identifier (RNTI) thereof and receives DCI intended for it upon correct decoding. The UE in the LTE system needs to perform blind detection on a control area in each downlink sub-frame in a discontinuous reception status to search for a PDCCH.

Figure 2:
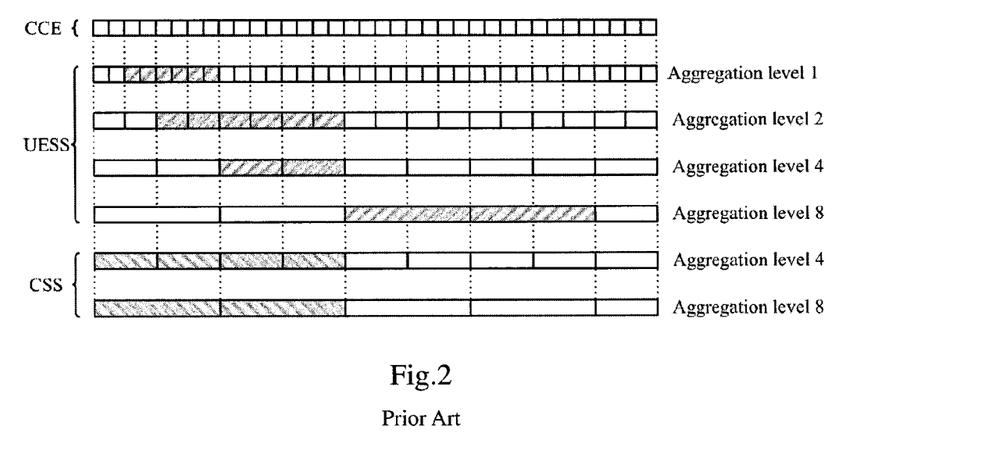
FIG. 2 is a schematic diagram of PDCCH blind detection in the prior art.

A control region in a sub-frame in the LTE system is consisted of two spaces which are a Common Search Space (CSS) and a UE-specific Search Space (UESS), where the common search space is primarily configured to transmit DCI for scheduling cell-specific control information (e.g. system information, paging information, group-east power control information, etc.), and the UE-specific search space is primarily configured to transmit DCI for scheduling respective UE resources. A common search space in each downlink sub-frame includes first 16 CCEs, and only two CCE aggregation levels of 4 and 8 are supported in the common search space; and a UE-specific search space of each LTE in each downlink sub-frame starts with a CCE location related to the serial number of the sub-frame, the RNTI of a UE, etc., and CCE aggregation levels of 1, 2, 4 and 8 are supported in the UE-specific search space. In the UESS, blind detection at each aggregation level corresponds to a search space in which there are a plurality of PDCCH candidates, that is, blind detection by the UE at a different aggregation level is performed in a different search space. Table 1 depicts a search space in which blind detection by a UE is required in a downlink sub-frame, where L represents the index of an aggregation level, Size represents the number of CCEs in which blind detection is required in correspondence to each aggregation level, and $M^{(L)}$ represents the number of blind detection attempts at the corresponding aggregation level and also the number of PDCCH candidates. FIG. 2 further illustrates a schematic diagram of the blind detection procedure. As depicted in Table 1, a UE needs to attempt blind detection on 22 PDCCH candidates including 6 PDCCH candidates in a common search space and 16 PDCCH candidates in a UE-specific search space.

TABLE 1

| | Search space $S_k^{(L)}$ | | |
|---|---|---|---|
| Type | Aggregation level L | Size [in CCEs] | Number of PDCCH candidates $M^{(L)}$ |
| UESS | 1 | 6 | 6 |
| | 2 | 12 | 6 |
| | 4 | 8 | 2 |
| | 8 | 16 | 2 |
| CSS | 4 | 16 | 4 |
| | 8 | 16 | 2 |

The capacity and transmission efficiency of PDSCHs in a Long Term Evolved-Advanced (LTE-A) system will be improved significantly due to the introduction of Multi-User Multi-Input Multi-Output (MU-MIMO), Coordinated Multi-Point transmission (CoMP), carrier aggregation and other schemes, and a Remote Radio Head (RRH) of an infra-cell identifier (ID), 8 antennas and other configurations; and PDCCH in the LIE-A system have not benefited from the emerging technologies for the purpose of an improvement over the earlier LTE versions (e.g., Rel-8/9).

In order to improve the performance of the LTE-A system and extend the capacity of PDCCHs, enhanced PDCCH (E-PDCCHs) have been introduced into the Release 11 (Rel-11).

Figure 3:
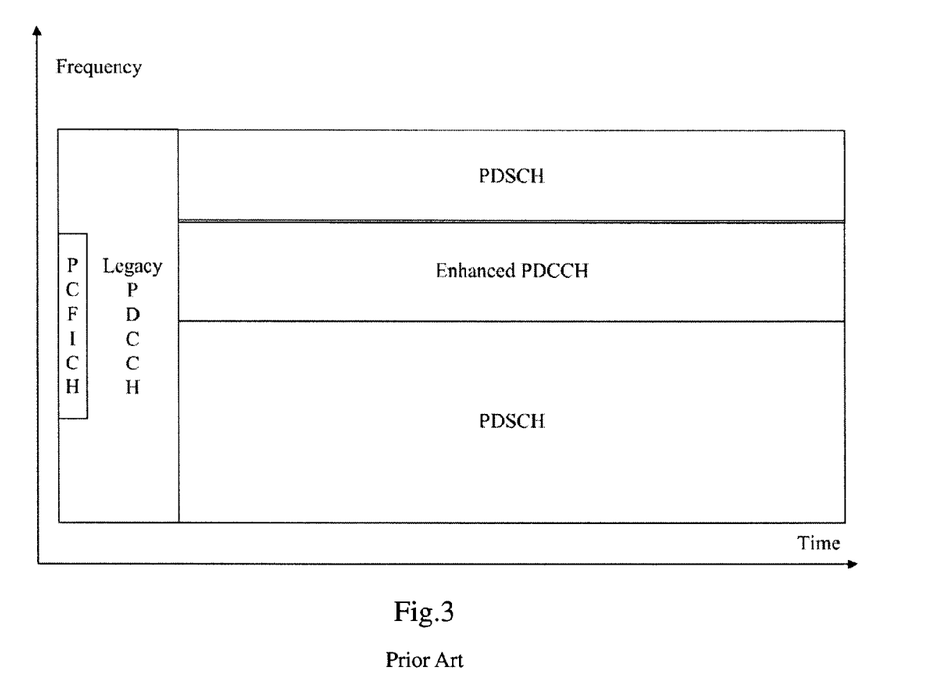
FIG. 3 is a schematic structural diagram of an enhanced PDCCH in the prior art.

In order to address a limited capacity of downlink control channels and improve the transmission efficiency of downlink control information, in one solution thereto, enhanced PDCCHs are transmitted in a PDSCH domain in a downlink sub-frame while reserving an original PDCCH domain in which existing transmission and reception schemes continue their use with original PDCCH resources, for example, transmit diversity for transmission and blind detection on DCI in a common search space and a UE-specific search space based upon a Common Reference Signal (CRS) for reception, where first N OFDM symbols are occupied for transmission, N may take the values 1, 2, 3 and 4, and N=4 may be allowable to occur only in a system at a system bandwidth of 1.4 MHz, and this part of the PDCCH domain is referred to a legacy PDCCH domain. Time and frequency resources beyond the legacy PDDCH domain are occupied for transmission in an enhanced PDCCH domain, where a part of the original PDCCH resources are frequency-division multiplexed with PDCCHs through, and this part of the PDCCH domain is referred to enhanced PDCCH domain. This solution of frequency-division multiplexing of enhanced PDCCHs with PDSCH is referred to FDM E-PDCCH, as illustrated in FIG. 3.

PDCCHs are transmitted in the prescribed modulation scheme of Quadrature Phase Shift Keying (QPSK) in the LTE Rel-8/9/10.

SUMMARY OF THE INVENTION

Embodiments of the invention provide a method and apparatus for transmitting information so as to perform a new method for transmitting information over a PDCCH.

A method for transmitting information includes:

determining, by a base station, a plurality of preset sets of blind detection candidates, each of which includes one or more Physical Downlink Control Channel, PDCCH, candidate; and transmitting, by the base station, control information to a user equipment over the PDCCH candidates in at least one of the plurality of sets of blind detection candidates.

A base station includes:

a resource determination unit configured to determine a plurality of preset sets of blind detection candidates, each of which includes one or more Physical Downlink Control Channel, PDCCH, candidates; and an information transmission unit configured to transmit control information to a user equipment over the PDCCH candidates in at least one of the plurality of sets of blind detection candidates.

In the solutions according to the embodiments of the invention, a base station determines a plurality of preset sets of blind detection candidates, each of which includes one or more PDCCH candidates, and transmits control information to a user equipment over the PDCCH candidates in at least one of the plurality of sets of blind detection candidates to thereby perform a new method for transmitting information over a PDCCH.

Embodiments of the invention further provide a method for blind detection of information and apparatus so as to perform a new method for blind detection of information over a PDCCH.

A method for blind detection of information includes:

determining, by a user equipment, a plurality of preset sets of blind detection candidates, each of which includes one or more Physical Downlink Control Channel. PDCCH, candidates; and performing, by the user equipment, blind detection of control information over the PDCCH candidates in the respective sets among the plurality of sets of blind detection candidates.

A user equipment includes:

a resource determination unit configured to determine a plurality of preset sets of blind detection candidates, each of which includes one or more Physical Downlink Control Channel, PDCCH, candidates; and a channel blind detection unit configured to perform blind detection of control information over the PDCCH candidates in the respective sets among the plurality of sets of blind detection candidates.

In the solutions according to the embodiments of the invention, a user equipment determines a plurality of preset sets of blind detection candidates, each of which includes one or more PDCCH candidate, and performs blind detection of control information over the PDCCH candidates in the respective sets among the plurality of sets of blind detection candidates to thereby perform a new method for blind detection of information over a PDCCH.

DETAILED DESCRIPTION OF THE EMBODIMENTS

In order to perform a novel method for transmitting information over a PDCCH, an embodiment of the invention provides a method for transmitting information in which a base station transmits control information to a user equipment over the PDCCH candidates in at least one of a plurality of preset sets of blind detection candidates.

Figure 4:
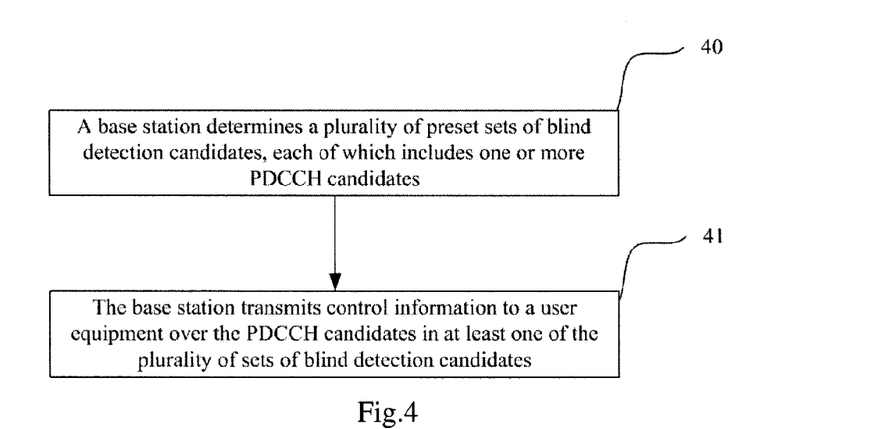
FIG. 4 is a schematic flow chart of a method according to an embodiment of the invention.

Referring to FIG. 4, a method for transmitting information according to an embodiment of the invention includes the following steps:

Step 40: A base station determines a plurality of preset sets of blind detection candidates, wherein each set includes one or more PDCCH candidates; and Step 41: The base station transmits control information, i.e., DCI, to a user equipment over the PDCCH candidates in at least one of the plurality of sets of blind detection candidates.

Preferably the plurality of sets of blind detection candidates can include two sets of blind detection candidates which are a first set of blind detection candidates and a second set of blind detection candidates.

The base station can transmit Downlink Control Information (DCI) to the user equipment over the PDCCH candidates in the first set of blind detection candidates with a prescribed data modulation scheme; and The base station can transmit the DCI to the user equipment over the PDCCH candidates in the second set of blind detection candidates with a data modulation scheme determined by the base station. The data modulation scheme can be determined by the base station according to Channel State Information (CSI) fed back by the user equipment. For example, a lower-order data modulation scheme, e.g., QPSK, can be selected when a poor channel condition is determined according to the CSI fed back by the user equipment; and a higher-order data modulation scheme, e.g., 16QPSK, can be selected when a good channel condition is determined according to the CSI fed back by the user equipment.

Here the prescribed data modulation scheme can be the QPSK modulation scheme. The data modulation scheme determined by the base station can be the modulation scheme of Quadrature Phase Shift Keying (QPSK) or 16QAM or 64QAM.

Furthermore the base station can notify the user equipment of the determined data modulation scheme particularly as follows:

The base station notifies via DCI or higher-layer signaling in a sub-frame n the user equipment of a data modulation scheme with which the DCI over the PDCCH candidates in the second set of blind detection candidates is demodulated starting with a sub-frame n+k, where n is an integer above or equal to zero, and k is an integer above or equal to 1, e.g., k=1 or 8.

The base station notifies the user equipment of the determined data modulation scheme so that the UE can know a data modulation scheme used practically by the base station when the base station transmits control information over the PDCCH candidates in the second set of blind detection candidates with the variable data modulation scheme to thereby avoid complicated blind detection by the user equipment and lower a limitation on scheduling as much as possible. A higher-order modulation scheme than the QPSK can be used in a good channel environment to improve the transmission efficiency of E-PDCCHs.

Specifically the DCI for notifying of the data modulation scheme can be transmitted over the PDCCH candidates in the first set of blind detection candidates.

The higher-layer signaling for notifying of the data modulation scheme can be user equipment-specific Radio Resource Control (RRC) signaling; the RRC signaling is transmitted over a PDSCH scheduled by PDCCH signaling; and the PDCCH signaling can be transmitted over the PDCCH candidates in the first set of blind detection candidates.

Furthermore before the base station transmits the DCI to the user equipment over the PDCCH candidates in the first set of blind detection candidates, the base station can determine a transmission mode in which the DCI is transmitted over the first set of blind detection candidates according to a preset correspondence relationship between sets of blind detection candidates and transmission modes and/or antenna port configuration information; for example, the base station determines the transmission mode in which the DCI is transmitted over the first set of blind detection candidates as a frequency diversity transmission mode and a multi-antenna diversity transmission mode according to the preset correspondence relationship between sets of blind detection candidates and transmission modes; or the base station determines the transmission mode in which the DCI is transmitted over the first set of blind detection candidates as a frequency diversity transmission mode and a multi-antenna diversity transmission mode according to the preset correspondence relationship between sets of blind detection candidates and transmission modes and the antenna port configuration information, and further determines that the base station is configured with a single antenna according to the antenna port configuration information and finally determines the transmission mode in which the DCI is transmitted over the first set of blind detection candidates as the frequency diversity transmission mode; or the base station determines the transmission mode in which the DCI is transmitted over the first set of blind detection candidates as a frequency diversity transmission mode or a multi-antenna diversity transmission mode according to the antenna port configuration information.

Then the base station can transmit the DCI to the user equipment over the PDCCH candidates in the first set of blind detection candidates in the determined transmission mode.

Alike, before the base station transmits the DCI to the user equipment over the PDCCH candidates in the second set of blind detection candidates, the base station can determine a transmission mode in which the DCI is transmitted over the second set of blind detection candidates and then transmit the DCI to the user equipment over the PDCCH candidates in the second set of blind detection candidates in the determined transmission mode. Preferably the base station can determine the transmission mode in which the DCI is transmitted over the second set of blind detection candidates according to channel state information fed back by the user equipment.

Preferably the transmission mode can be a frequency-consecutive transmission mode, or a frequency diversity transmission mode, or a frequency-consecutive transmission mode and a multi-antenna diversity transmission mode, or a frequency-consecutive transmission mode and a pre-coding transmission mode, or a frequency diversity transmission mode and a multi-antenna diversity transmission mode, or a frequency diversity transmission mode and a pre-coding transmission mode, or a multi-antenna diversity transmission mode, or a pre-coding transmission mode.

Preferably the DCI can be transmitted over the first set of blind detection candidates in a highly robust transmission mode, e.g., a frequency diversity transmission mode or a multi-antenna diversity transmission mode.

In this method, the first set of blind detection candidates can include all of PDCCH candidates in a common search space among enhanced PDCCHs; or all of PDCCH candidates in a common search space among enhanced PDCCHs and a part or all of PDCCH candidates in a UE-specific search space among enhanced PDCCHs; or a part or all of PDCCH candidates in a UE-specific search space among enhanced PDCCHs. The second set of blind detection candidates can include a part of PDCCH candidates in a UE-specific search space among enhanced PDCCHs.

When the first set of blind detection candidates includes all of PDCCH candidates in a common search space among enhanced PDCCHs, the DCI transmitted over the PDCCH candidates in the first set of blind detection candidates can include DCI scrambled by a common Radio Network Temporary Identifier (RNTI);

When the first set of blind detection candidates includes all of PDCCH candidates in a common search space among enhanced PDCCHs and a part or all of PDCCH candidates in a UE-specific search space among enhanced PDCCHs, the DCI transmitted over the PDCCH candidates in the first set of blind detection candidates can include DCI scrambled by a common RNTI and/or DCI scrambled by a specific RNTI; and When the first set of blind detection candidates includes a part of PDCCH candidates in a UE-specific search space among enhanced PDCCHs, the DCI transmitted over the PDCCH candidates in the first set of blind detection candidates can include DCI scrambled by a specific RNTI.

The DCI transmitted over the PDCCH candidates in the second set of blind detection candidates can include DCI scrambled by a specific RNTI.

Preferably before the base station transmits the control information to the user equipment over the PDCCH candidates in the at least one of the plurality of sets of blind detection candidates, the base station can transmit to the user equipment information about PDCCH candidates included in the respective sets among the plurality of sets of blind detection candidates so that the user knows information about the plurality of preset sets of blind detection candidates and further performs blind detection of control information. The information about the PDCCH candidates includes the number and locations of the PDCCH candidates and other information.

In this method, each PDCCH candidate can be located in an enhanced PDCCH region.

This method can be applicable at various PDCCH aggregation levels, for example, the DCI is transmitted over the E-PDCCHs still in CCEs at aggregation levels of $\{1, 2, 4, 8\}$. That is, the base station transmits the control information to the user equipment in CCEs at a specific aggregation level of CCEs. Of course, the base station can alternatively transmit the control information to the user equipment in Resource Blocks (RBs).

In order to perform a novel method for blind detection of information over a PDCCH corresponding to the foregoing method for transmitting information, an embodiment of the invention provides a method for blind detection of information, and in the invention, a user equipment performs blind detection of control information over the PDCCH candidates in the respective sets among a plurality of preset sets of blind detection candidates.

Figure 5:
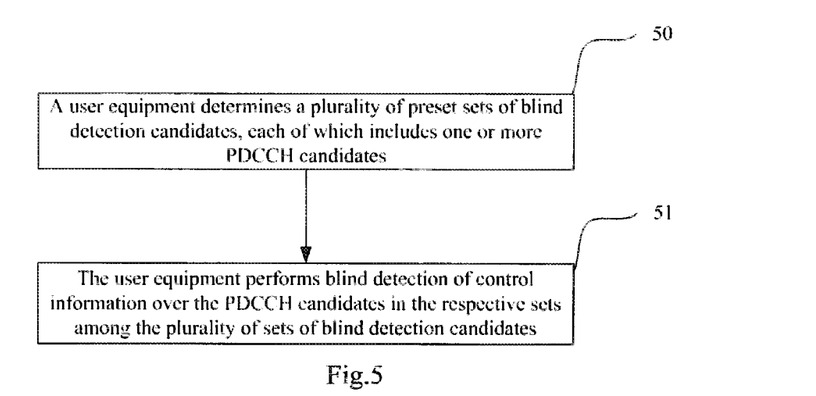
FIG. 5 is a schematic flow chart of another method according to an embodiment of the invention.

Referring to FIG. 5, a method for blind detection of information according to an embodiment of the invention includes the following steps:

Step 50: A user equipment determines a plurality of preset sets of blind detection candidates, wherein each set includes one or more PDCCH candidates; and Step 51: The user equipment performs blind detection of control information (i.e., DCI) over the PDCCH candidates in the respective sets among the plurality of sets of blind detection candidates.

Preferably the plurality of sets of blind detection candidates can include two sets of blind detection candidates which are a first set of blind detection candidates and a second set of blind detection candidates.

In the step 51, the user equipment performs blind detection of Downlink Control Information (DCI) over the PDCCH candidates in the first set of blind detection candidates with a prescribed data modulation scheme; and performs blind detection of the DCI over the PDCCH candidates in the second set of blind detection candidates with a data modulation scheme determined by the base station. Specifically the user equipment demodulates the DCI over the PDCCH candidates in the second set of blind detection candidates starting with a sub-frame n+k with a data modulation scheme notified via DCI or higher-layer signaling received in a sub-frame n, where n is an integer above or equal to zero, and k is an integer above or equal to 1.

Specifically the DCI for notifying of the data modulation scheme can be transmitted over the PDCCH candidates in the first set of blind detection candidates.

The higher-layer signaling for notifying of the data modulation scheme can be user equipment-specific RRC signaling; the RRC signaling is transmitted over a PDSCH scheduled by PDCCH signaling; and the PDCCH signaling can be transmitted over the PDCCH candidates in the first set of blind detection candidates.

Here the prescribed data modulation scheme can be the QPSK modulation scheme. The data modulation scheme notified of by the base station can be the modulation scheme of QPSK or 16QAM or 64QAM.

Preferably the first set of blind detection candidates can include all of PDCCH candidates in a common search space among enhanced PDCCHs; or all of PDCCH candidates in a common search space among enhanced PDCCHs and a part or all of PDCCH candidates in a UE-specific search space among enhanced PDCCHs; or a part or all of PDCCH candidates in a UE-specific search space among enhanced PDCCHs. The second set of blind detection candidates can include a part of PDCCH candidates in a UE-specific search space among enhanced PDCCHs.

In the step 50, the user equipment can receive information transmitted by the base station about PDCCH candidates in the respective sets among the plurality of sets of blind detection candidates and determine the plurality of sets of blind detection candidates from the information. Of course, the user equipment can alternatively know the information about the PDCCH candidates from preset search space information without being notified by the base station.

The information about the PDCCH candidates includes the number and locations of the PDCCH candidates and other information.

In this method, each PDCCH candidate can be located in an enhanced PDCCH region.

This method can be applicable at various PDCCH aggregation levels, for example, the DCI is transmitted over the E-PDCCHs still in CCEs at aggregation levels of {1, 2, 4, 8}. At this time, the user equipment performs blind detection of data over the PDCCH candidates in CCEs at a specific aggregation level of CCEs. Of course, the user equipment can alternatively perform blind detection in Resource Blocks (RBs).

Figure 6:
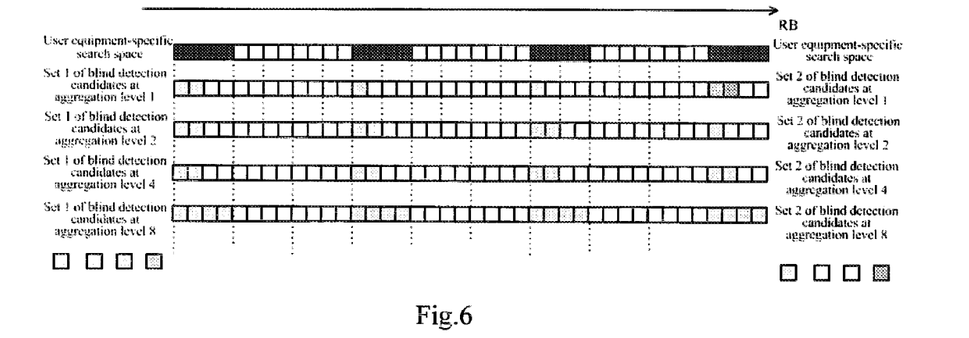
FIG. 6 is a schematic diagram of a set of blind detection candidates according to an embodiment of the invention.

As illustrated in FIG. 6, the UE is configured by the system with 16 RBs for possible transmission of E-PDCCHs, where the 16 RBs are divided in the form of 4 nonconsecutive clusters of resources, each of which includes 4 consecutive RBs. If the UE needs to perform E-DPCCH blind detection over PDCCH candidates counted in RBs in the frequency domain, then FIG. 6 illustrates PDCCH candidates in a set of blind detection candidates 1 and a set of blind detection candidates 2 at respective aggregation levels respectively. Here only parts of the PDCCH candidates in the two sets of blind detection candidates are illustrated, but other PDCCH candidates may be further included in each set of blind detection candidates without any limitation. In the example, the PDCCH candidates in the set of blind detection candidates 1 are arranged for a maximized frequency diversity gain so as to ensure constant transmission performance of the DCI carried therein, and the PDCCH candidates in the set of blind detection candidates 2 are arranged without any limitation, for example, the PDCCH candidates can be arranged in a centralized manner in frequency domain to maximize frequency scheduling gain and beamforming gain.

Figure 7:
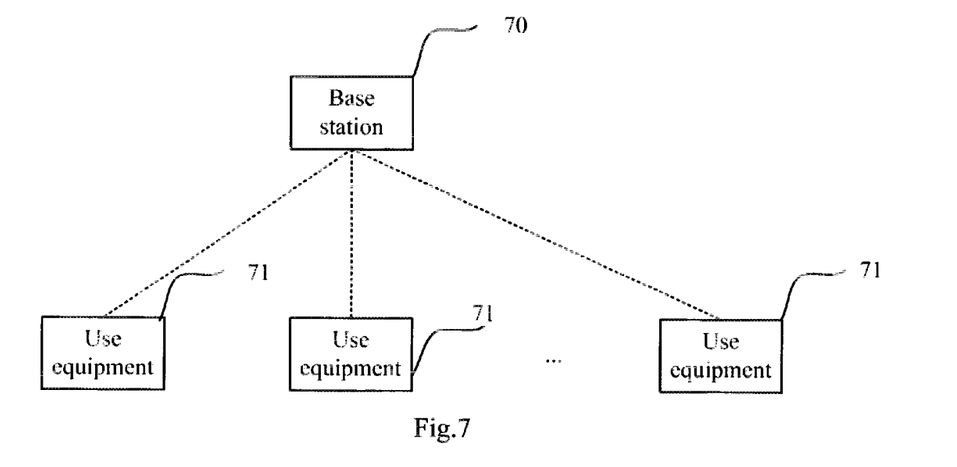
FIG. 7 is a schematic structural diagram of a system according to an embodiment of the invention.

Based upon the same inventive idea, referring to FIG. 7, an embodiment of the invention provides a wireless communication system, and reference can be made to the description of the method above for a particular implementation of the system, and a repeated description thereof will be omitted here, where the system includes:

A base station 70 is configured to determine a plurality of preset sets of blind detection candidates, wherein each set includes one or more PDCCH candidates; and to transmit control information (i.e., DCI) to a user equipment over the PDCCH candidates in at least one of the plurality of sets of blind detection candidates; and The user equipment 71 is configured to determine the plurality of preset sets of blind detection candidates, each set includes one or more PDCCH candidates; and to perform blind detection of the control information (i.e., DCI) over the PDCCH candidates in the respective sets among the plurality of sets of blind detection candidates.

Figure 8:
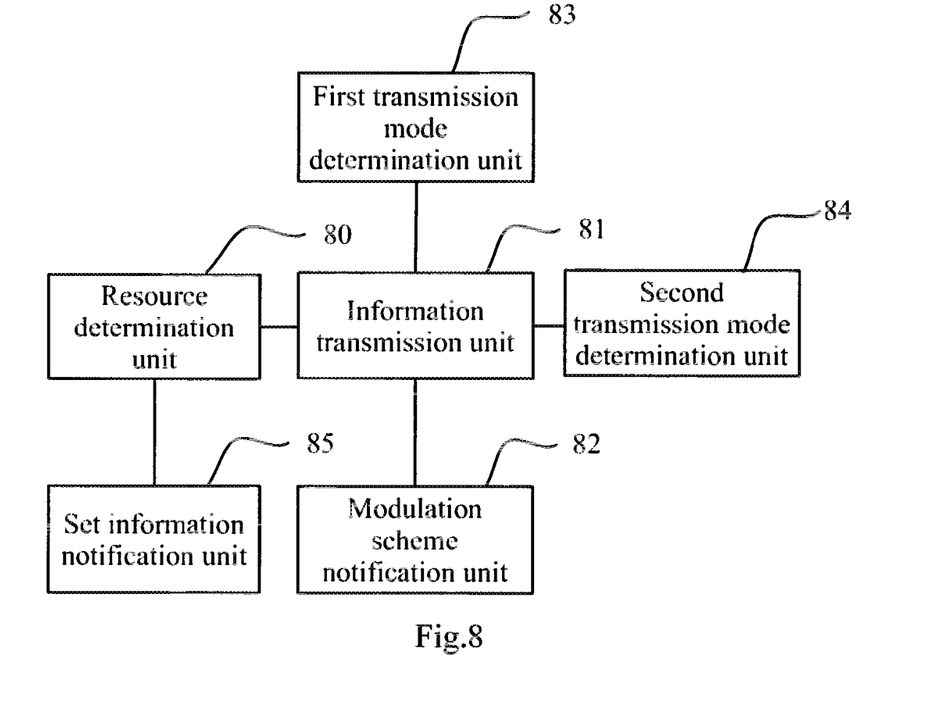
FIG. 8 is a schematic structural diagram of a base station according to an embodiment of the invention.

Based upon the same inventive idea, referring to FIG. 8, an embodiment of the invention provides a base station, and reference can be made to the description of the method above for a particular implementation of the base station, and a repeated description thereof will be omitted here, where the base station includes:

A resource determination unit 80 is configured to determine a plurality of preset sets of blind detection candidates, wherein each set includes one or more PDCCH candidates; and An information transmission unit 81 is configured to transmit control information (i.e., DCI) to a user equipment over the PDCCH candidates in at least one of the plurality of sets of blind detection candidates.

The plurality of sets of blind detection candidates include a first set of blind detection candidates and a second set of blind detection candidates.

The information transmission unit 81 is configured:

To transmit DCI to the user equipment over the PDCCH candidates in the first set of blind detection candidates with a prescribed data modulation scheme; and to transmit the DCI to the user equipment over the PDCCH candidates in the second set of blind detection candidates with a data modulation scheme determined by the base station.

The data modulation scheme can be determined by the base station according to channel state information fed back by the user equipment.

The base station further includes a modulation scheme notification unit 82 configured to notify the user equipment of the determined data modulation scheme.

The modulation scheme notification unit 82 is configured to notify via DCI or higher-layer signaling in a sub-frame n the user equipment of a data modulation scheme with which the DCI over the PDCCH candidates in the second set of blind detection candidates is demodulated starting with a sub-frame n+k, where n is an integer above or equal to zero, and k is an integer above or equal to 1.

The DCI for notifying of the data modulation scheme is transmitted over the PDSCH candidates in the first set of blind detection candidates.

The higher-layer signaling for notifying of the data modulation scheme is user equipment-specific Radio Resource Control (RRC) signaling; and the RRC signaling is transmitted over a PDSCH scheduled by PDCCH signaling; and The PDCCH signaling is transmitted over the PDCCH candidates in the first set of blind detection candidates.

The base station further includes a first transmission mode determination unit 83 configured to determine a transmission mode in which the DCI is transmitted over the first set of blind detection candidates according to a preset correspondence relationship between sets of blind detection candidates and transmission modes and/or antenna port configuration information before the DCI is transmitted to the user equipment over the PDCCH candidates in the first set of blind detection candidates; and The information transmission unit 81 is configured to transmit the DCI to the user equipment over the PDCCH candidates in the first set of blind detection candidates in the determined transmission mode.

The base station further includes a second transmission mode determination unit 84 configured to determine a transmission mode in which the DCI is transmitted over the second set of blind detection candidates before the DCI is transmitted to the user equipment over the PDCCH candidates in the second set of blind detection candidates; and The information transmission unit 81 is configured to transmit the DCI to the user equipment over the PDCCH candidates in the second set of blind detection candidates in the determined transmission mode.

The second transmission mode determination unit 84 is configured to determine the transmission mode in which the DCI is transmitted over the second set of blind detection candidates according to channel state information fed back by the user equipment.

The transmission mode is a frequency-consecutive transmission mode, or a frequency diversity transmission mode, or a frequency-consecutive transmission mode and a multi-antenna diversity transmission mode, or a frequency-consecutive transmission mode and a pre-coding transmission mode, or a frequency diversity transmission mode and a multi-antenna diversity transmission mode, or a frequency diversity transmission mode and a pre-coding transmission mode, or a multi-antenna diversity transmission mode, or a we-coding transmission mode.

The first set of blind detection candidates includes all of PDCCH candidates in a common search space among enhanced PDCCHs; or all of PDCCH candidates in a common search space among enhanced PDCCHs and a part or all of PDCCH candidates in a UE-specific search space among enhanced PDCCHs; or a part or all of PDCCH candidates in a UE-specific search space among enhanced PDCCHs.

The second set of blind detection candidates includes a part of PDCCH candidates in a UE-specific search space among enhanced PDCCHs.

The prescribed data modulation scheme is the QPSK modulation scheme.

The data modulation scheme determined by the base station is the modulation scheme of QPSK or 16QAM or 64QAM.

The base station further includes:

A set information notification unit 85 is configured to transmit information to the user equipment about PDCCH candidates in the respective sets among the plurality of sets of blind detection candidates before the control information is transmitted to the user equipment over the PDCCH candidates in the at least one of the plurality of sets of blind detection candidate.

Each PDCCH candidate is located in an enhanced PDCCH region.

Figure 9:
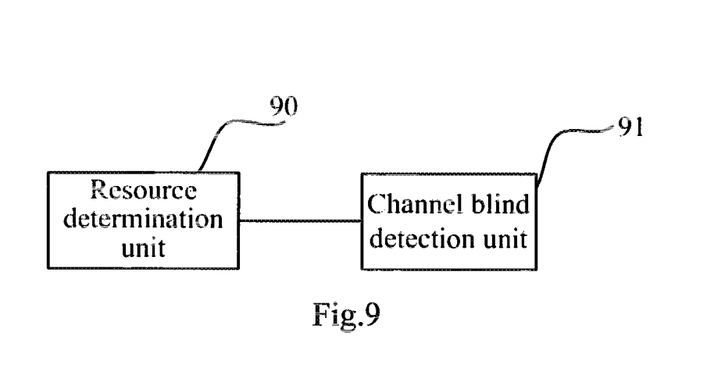
FIG. 9 is a schematic structural diagram of a user equipment according to an embodiment of the invention.

Based upon the same inventive idea, referring to FIG. 9, an embodiment of the invention provides a user equipment, and reference can be made to the description of the method above for a particular implementation of the user equipment, and a repeated description thereof will be omitted here, where the user equipment includes:

A resource determination unit 90 is configured to determine a plurality of preset sets of blind detection candidates, each set includes one or more PDCCH candidates; and A channel blind detection unit 91 is configured to perform blind detection of control information (i.e., DCI) over the PDCCH candidates in the respective sets among the plurality of sets of blind detection candidates.

The plurality of sets of blind detection candidates include a first set of blind detection candidates and a second set of blind detection candidates.

The channel blind detection unit 91 is configured:

To perform blind detection of DCI over the PDCCH candidates in the first set of blind detection candidates with a prescribed data modulation scheme; and To perform blind detection of the DCI over the PDCCH candidates in the second set of blind detection candidates with a data modulation scheme determined by the base station.

The channel blind detection unit 91 is configured:

To demodulate the DCI over the PDCCH candidates in the second set of blind detection candidates starting with a sub-frame n±k with a data modulation scheme notified of via DCI or higher-layer signaling received in a sub-frame n, where n is an integer above or equal to zero, and k is an integer above or equal to 1.

The DCI for notifying of the data modulation scheme is transmitted over the PDCCH candidates in the first set of blind detection candidates.

The higher-layer signaling for notifying of the data modulation scheme is user equipment-specific RRC signaling; and the RRC signaling is transmitted over a PDSCH scheduled by PDCCH signaling; and The PDCCH signaling is transmitted over the PDCCH candidates in the first set of blind detection candidates.

The first set of blind detection candidates includes all of PDCCH candidates in a common search space among enhanced PDCCHs; or all of PDCCH candidates in a common search space among enhanced PDCCHs and a part or all of PDCCH candidates in a UE-specific search space among enhanced PDCCHs; or a part or all of PDCCH candidates in a UE-specific search space among enhanced PDCCHs.

The second set of blind detection candidates includes a part of PDCCH candidates in a UE-specific search space among enhanced PDCCHs.

The prescribed data modulation scheme is the QPSK modulation scheme.

The data modulation scheme notified of by the base station is the modulation scheme of QPSK or 16QAM or 64QAM.

The resource determination unit 90 is configured:

To receive information transmitted by the base station about PDCCH candidates in the respective sets among the plurality of sets of blind detection candidates and to determine the plurality of sets of blind detection candidates from the information.

Each PDCCH candidate is located in an enhanced PDCCH region.

In summary, advantageous effects of the invention include:

In a solution according to an embodiment of the invention, a base station determines a plurality of preset sets of blind detection candidates, each of which includes one or more PDCCH candidates, and transmits control information to a user equipment over the PDCCH candidates in at least one of the plurality of sets of blind detection candidates to thereby perform a novel method for transmitting information over a PDCCH.

In a solution according to an embodiment of the invention, a user equipment determines a plurality of preset sets of blind detection candidates, each of which includes one or more PDCCH candidates, and performs blind detection of control information over the PDCCH candidates in the respective sets among the plurality of sets of blind detection candidates to thereby perform a novel method for blind detection of information over a PDCCH.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method for transmitting information, comprising:
   determining, by a base station, a plurality of preset sets of blind detection candidates, each of which comprises one or more Physical Downlink Control Channel, PDCCH, candidates; and
   transmitting, by the base station, control information to a user equipment over the PDCCH candidates in at least one of the plurality of sets of blind detection candidates;
   wherein the plurality of sets of blind detection candidates comprise a first set of blind detection candidates and a second set of blind detection candidates; and
   the base station transmits Downlink Control Information, DCI, to the user equipment over the PDCCH candidates in the first set of blind detection candidates with a prescribed data modulation scheme; and the base station transmits the DCI to the user equipment over the PDCCH candidates in the second set of blind detection candidates with a data modulation scheme determined by the base station;
   wherein the first set of blind detection candidates comprises all of PDCCH candidates in a common search space among enhanced PDCCHs; or all of PDCCH candidates in a common search space among enhanced PDCCHs and a part or all of PDCCH candidates in a UE-specific search space among enhanced PDCCHs; or a part or all of PDCCH candidates in a UE-specific search space among enhanced PDCCHs; and
   the second set of blind detection candidates comprises a part of PDCCH candidates in a UE-specific search space among enhanced PDCCHs.

2. The method according to claim 1, wherein the data modulation scheme determined by the base station is a data modulation scheme determined by the base station according to channel state information fed back by the user equipment, and the method further comprises:
   notifying, by the base station, the user equipment of the determined data modulation scheme.

3. The method according to claim 1, wherein before the base station transmits the DCI to the user equipment over the PDCCH candidates in the first set of blind detection candidates, the method further comprises:
   determining, by the base station, a transmission mode in which the DCI is transmitted over the first set of blind detection candidates according to a preset correspondence relationship between sets of blind detection candidates and transmission modes and/or antenna port configuration information; and
   the transmitting the DCI to the user equipment over the PDCCH candidates in the first set of blind detection candidates comprises:
   transmitting, by the base station, the DCI to the user equipment over the PDCCH candidates in the first set of blind detection candidates in the determined transmission mode.

4. The method according to claim 1, wherein before the base station transmits the DCI to the user equipment over the PDCCH candidates in the second set of blind detection candidates, the method further comprises:
   determining, by the base station, a transmission mode in which the DCI is transmitted over the second set of blind detection candidates; and
   the transmitting the DCI to the user equipment over the PDCCH candidates in the second set of blind detection candidates comprises:
   transmitting, by the base station, the DCI to the user equipment over the PDCCH candidates in the second set of blind detection candidates in the determined transmission mode.

5. The method according to claim 1, wherein the prescribed data modulation scheme is the modulation scheme of Quadrature Phase Shift Keying, QPSK.

6. The method according to claim 1, wherein the data modulation scheme determined by the base station is the modulation scheme of QPSK or 16QAM or 64QAM.

7. A method for blind detection of information, comprising:
   determining, by a user equipment, a plurality of preset sets of blind detection candidates, each of which comprises one or more Physical Downlink Control Channel, PDCCH, candidates; and
   performing, by the user equipment, blind detection of control information over the PDCCH candidates in the respective sets among the plurality of sets of blind detection candidates;
   wherein the plurality of sets of blind detection candidates comprise a first set of blind detection candidates and a second set of blind detection candidates; and the performing, by the user equipment, blind detection of the control information over the PDCCH candidates in the respective sets among the plurality of sets of blind detection candidates comprises:
   performing, by the user equipment, blind detection of Downlink Control Information, DCI, over the PDCCH candidates in the first set of blind detection candidates with a prescribed data modulation scheme; and
   performing, by the user equipment, blind detection of the DCI over the PDCCH candidates in the second set of blind detection candidates with a data modulation scheme notified by the base station;
   wherein the first set of blind detection candidates comprises all of PDCCH candidates in a common search space among enhanced PDCCHs; or all of PDCCH candidates in a common search space among enhanced PDCCHs and a part or all of PDCCH candidates in a UE-specific search space among enhanced PDCCHs; or a part or all of PDCCH candidates in a UE-specific search space among enhanced PDCCHs; and
   the second set of blind detection candidates comprises a part of PDCCH candidates in a UE-specific search space among enhanced PDCCHs.

8. The method according to claim 7, wherein the prescribed data modulation scheme is the modulation scheme of Quadrature Phase Shift Keying, QPSK.

9. The method according to claim 7, wherein the data modulation scheme notified of by the base station is the modulation scheme of QPSK or 16QAM or 64QAM.

10. The method according to claim 7, wherein determining, by the user equipment, the plurality of preset sets of blind detection candidates comprises:
    receiving, by the user equipment, information transmitted by the base station about PDCCH candidates in the respective sets among the plurality of sets of blind detection candidates and determining the plurality of sets of blind detection candidates from the information.

11. A base station, comprising:
    a resource determination unit configured to determine a plurality of preset sets of blind detection candidates, each of which comprises one or more Physical Downlink Control Channel, PDCCH, candidates; and
    an information transmission unit configured to transmit control information to a user equipment over the PDCCH candidates in at least one of the plurality of sets of blind detection candidates;
    wherein the plurality of sets of blind detection candidates comprise a first set of blind detection candidates and a second set of blind detection candidates; and the information transmission unit is further configured:
    to transmit Downlink Control Information, DCI, to the user equipment over the PDCCH candidates in the first set of blind detection candidates with a prescribed data modulation scheme; and
    to transmit the DCI to the user equipment over the PDCCH candidates in the second set of blind detection candidates with a data modulation scheme determined by the base station;
    wherein the first set of blind detection candidates comprises all of PDCCH candidates in a common search space among enhanced PDCCHs; or all of PDCCH candidates in a common search space among enhanced PDCCHs and a part or all of PDCCH candidates in a UE-specific search space among enhanced PDCCHs; or a part or all of PDCCH candidates in a UE-specific search space among enhanced PDCCHs; and
    the second set of blind detection candidates comprises a part of PDCCH candidates in a UE-specific search space among enhanced PDCCHs.

12. The base station according to claim 11, wherein the data modulation scheme determined by the base station is a data modulation scheme determined by the base station according to channel state information fed back by the user equipment; and the base station further comprises:
    a modulation scheme notification unit configured to notify the user equipment of the determined data modulation scheme.

13. The base station according to claim 11, wherein the base station further comprises:
    a first transmission mode determination unit configured to determine a transmission mode in which the DCI is transmitted over the first set of blind detection candidates according to a preset correspondence relationship between sets of blind detection candidates and transmission modes and/or antenna port configuration information before the DCI is transmitted to the user equipment over the PDCCH candidates in the first set of blind detection candidates; and the information transmission unit is configured:

to transmit the DCI to the user equipment over the PDCCH candidates in the first set of blind detection candidates in the determined transmission mode.

14. The base station according to claim 11, wherein the base station further comprises:

a second transmission mode determination unit configured to determine a transmission mode in which the DCI is transmitted over the second set of blind detection candidates before the DCI is transmitted to the user equipment over the PDCCH candidates in the second set of blind detection candidates; and the information transmission unit is configured to transmit the DCI to the user equipment over the PDCCH candidates in the second set of blind detection candidates in the determined transmission mode.

15. A user equipment, comprising:

a resource determination unit configured to determine a plurality of preset sets of blind detection candidates, each of which comprises one or more Physical Downlink Control Channel, PDCCH, candidates; and a channel blind detection unit configured to perform blind detection of control information over the PDCCH candidates in the respective sets among the plurality of sets of blind detection candidates;

wherein the plurality of sets of blind detection candidates comprise a first set of blind detection candidates and a second set of blind detection candidates; and the channel blind detection unit is further configured:

to perform blind detection of Downlink Control Information, DCI, over the PDCCH candidates in the first set of blind detection candidates in a prescribed data modulation scheme; and to perform blind detection of the DCI over the PDCCH candidates in the second set of blind detection candidates in a data modulation scheme notified by the base station;

wherein the first set of blind detection candidates comprises all of PDCCH candidates in a common search space among enhanced PDCCHs; or all of PDCCH candidates in a common search space among enhanced PDCCHs and a part or all of PDCCH candidates in a UE-specific search space among enhanced PDCCHs; or a part or all of PDCCH candidates in a UE-specific search space among enhanced PDCCHs;

the second set of blind detection candidates comprises a part of PDCCH candidates in a UE-specific search space among enhanced PDCCHs.

16. The user equipment according to claim 15, wherein the resource determination unit is configured:

to receive information transmitted by the base station about PDCCH candidates in the respective sets among the plurality of sets of blind detection candidates and to determine the plurality of sets of blind detection candidates from the information.

* * * * *